US012010138B2

United States Patent
Jimenez-Delgado

(10) Patent No.: US 12,010,138 B2
(45) Date of Patent: Jun. 11, 2024

(54) SECURE BLOCKCHAIN-BASED CONSENSUS

(71) Applicant: nChain Licensing AG, Zug (CH)

(72) Inventor: Pedro Jimenez-Delgado, London (GB)

(73) Assignee: nChain Licensing AG, Zug (CH)

(*) Notice: Subject to any disclaimer, the term of this patent is extended or adjusted under 35 U.S.C. 154(b) by 0 days.

(21) Appl. No.: 17/972,436

(22) Filed: Oct. 24, 2022

(65) Prior Publication Data

US 2023/0120854 A1 Apr. 20, 2023

Related U.S. Application Data

(63) Continuation of application No. 16/606,204, filed as application No. PCT/IB2018/052619 on Apr. 16, 2018, now Pat. No. 11,483,338.

(30) Foreign Application Priority Data

Apr. 18, 2017 (GB) ...................................... 1706132

(51) Int. Cl.
*H04L 9/40* (2022.01)
*H04L 9/06* (2006.01)
(Continued)

(52) U.S. Cl.
CPC .......... *H04L 63/145* (2013.01); *H04L 9/0637* (2013.01); *H04L 9/0643* (2013.01);
(Continued)

(58) Field of Classification Search
CPC ... H04L 63/145; H04L 9/0637; H04L 9/0643; H04L 9/3239; H04L 9/3252; H04L 9/3255; H04L 9/50; H04L 63/123; H04L 63/1425

See application file for complete search history.

(56) References Cited

U.S. PATENT DOCUMENTS

2013/0080307 A1 3/2013 Hoffberg
2014/0189497 A1* 7/2014 Cahill .................. G06F 40/143
715/234

(Continued)

FOREIGN PATENT DOCUMENTS

CN 105809062 A 7/2016

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Cheng-Feng Huang
(74) *Attorney, Agent, or Firm* — Davis Wright Tremaine LLP

(57) ABSTRACT

There may be provided a computer-implemented method. The computer-implemented method includes: i) broadcasting a transaction, by a node in a blockchain network, to a congress pool to join a congress formed of a group of nodes; ii) after the congress has accepted a request from a requester to activate a script, preparing, by the node, a blockchain transaction cryptographically locked with a public key associated with the congress; iii) cooperatively generating, by the node in cooperating with other nodes of the group, a valid cryptographic signature for the transaction to spend the transaction; iv) after the blockchain transaction has been unlocked, receiving data from the plurality of information providing systems; v) determining a centre point for the data received from the plurality of information providing systems; and vi) activating, by the node in cooperation with other nodes of the congress, the script based on the centre point.

13 Claims, 9 Drawing Sheets

(51) Int. Cl.
  *H04L 9/32*  (2006.01)
  *H04L 9/00*  (2022.01)
(52) U.S. Cl.
  CPC .......... *H04L 9/3239* (2013.01); *H04L 9/3252* (2013.01); *H04L 9/3255* (2013.01); *H04L 9/50* (2022.05); *H04L 63/123* (2013.01); *H04L 63/1425* (2013.01)

(56) References Cited

U.S. PATENT DOCUMENTS

| | | | | |
|---|---|---|---|---|
| 2016/0217532 | A1* | 7/2016 | Slavin | G06Q 30/0276 |
| 2016/0330034 | A1 | 11/2016 | Back et al. | |
| 2016/0335533 | A1 | 11/2016 | Davis et al. | |
| 2017/0046638 | A1 | 2/2017 | Chan et al. | |
| 2017/0085545 | A1 | 3/2017 | Lohe et al. | |
| 2017/0109744 | A1* | 4/2017 | Wilkins | H04L 9/3236 |
| 2017/0250972 | A1* | 8/2017 | Ronda | H04L 9/0891 |
| 2018/0039667 | A1* | 2/2018 | Pierce | H04L 9/3247 |
| 2018/0130050 | A1* | 5/2018 | Taylor | G06Q 20/065 |

OTHER PUBLICATIONS

Boldyreva, "Threshold Signatures, Multisignatures and Blind Signatures Based on the Gap-Diffie-Hellman-Group Signature Scheme," Advances in Databases and Information Systems, Dec. 18, 2002, 16 pages.
ChainLink, "Blockchain Oracles for Hybrid Smart Contracts," retrieved from https://link.smartcontract.com/whitepaper, 9 pages.
Edgar, "Ethereum Stack Exchange," retrieved from https://ethereum.stackexchange.com/questions/2156/contracts-as-data-feed, Apr. 25, 2017, 2 pages.
Ellis et al., "ChainLink: A Decentralized Oracle Network," Sep. 4, 2017 [retrieved Feb. 5, 2018], https://link.smartcontract.com/whitepaper, 38 pages.
Extended European Search Report for Application No. 21155519.8, dated Jun. 18, 2021, 9 pages.
Github, "Randao: A DAO Working as RNG of Ethereum," retrieved from http://github.com/randao/randao, Apr. 6, 2018, 3 pages.
Ibrahim et al., "A robust threshold elliptic curve digital signature providing a new verifiable secret sharing scheme," 2003 IEEE 46th Midwest Symposium on Circuits and Systems 1:276-280, Dec. 30, 2003, 6 pages.
International Search Report and Written Opinion for Application No. PCT/IB2018/052619, dated Jun. 15, 2018, Apr. 16, 2018, 12 pages.
Nakamoto, "Bitcoin: A Peer-to-Peer Electronic Cash System," Bitcoin, Oct. 31, 2008, https://bitcoin.org/bitcoin.pdf, 9 pages.
Orisi, "Orisi White Paper," retrieved from https://github.com/orisi/wiki/wiki/Orisi-White-Paper, Nov. 29, 2014, 5 pages.
Pedro et al., "Witnet: A Decentralized Oracle Network Protocol," Nov. 27, 2017, 58 pages.
Peterson et al., "Augur: a Decentralized, Open-Source Platform for Prediction Markets," Jan. 5, 2015, 13 pages.
Randao, "Randao: Verifiable Random Number Generation," Randao.org, Sep. 11, 2017, 24 pages.
Randao, "README.md at master," GitHub, Jul. 31, 2016 [retrieved Jan. 5, 2018], https://github.com/randao/randao/blob/master/README.md, 8 pages.
Reddit, "How an Anchored Proof of Stake Sidechain Can Help the Bitcoin Main Chain," retrieved from https://www.reddit.com/r/Bitcoin/comments/5vy4qc/how_an_anchored_proof_of_stake_sidechain_can_help/, Feb. 24, 2017, 9 pages.
Satoshi et al., "Connection Limits," Bitcoin Forum, Aug. 9, 2010, https://bitcointalk.org/index.php?topic=741.0;prev_next=prev, 2 pages.
Wood et al., "Polkadot: Vision for A Heterogeneous Multi-Chain Framework," retrieved from https://github.com/polkadot-io/polkadotpaper, Sep. 10, 2016, 21 pages.
Zhang et al., "Town Crier: An Authenticated Data Feed for Smart Contracts," International Association for Cryptologic Research, Mar. 30, 2016, 20 pages.
UK Commercial Search Report dated Jun. 2, 2017, Patent Application No. GB1706132.6, 7 pages.
UK IPO Search Report dated Oct. 2, 2017, Patent Application No. GB1706132.6, 6 pages.
Higashikado et al., A Study on Certificate Management in Consortium Chain, The Institute of Electronics Information and Communication Engineers, SCIS 2017, 8 pages.
Goldfeder, et al., "Securing Bitcoin Wallets Via Threshold Signatures", Computer Science, Mathematics, 2014, 11 pages.
Sako et al., "Kazue, Transparency and Fairness" The Blockchain Technology to Realize, an Information Processing, Japan, General Incorporated Foundation Information Processing Society of Japan, Aug. 15, 2016, 57th vol. No. 9, 10 pages.

* cited by examiner

SECURE BLOCKCHAIN-BASED CONSENSUS

CROSS-REFERENCE TO RELATED APPLICATIONS

This application is a continuation of U.S. patent application Ser. No. 16/606,204, filed Oct. 17, 2019, entitled "SECURE BLOCKCHAIN-BASED CONSENSUS," which is a 371 National Stage of International Patent Application No. PCT/IB2018/052619, filed Apr. 16, 2018, which claims priority to United Kingdom Patent Application No. 1706132.6, filed Apr. 18, 2017, the disclosures of which are incorporated herein by reference in their entirety.

This invention relates generally to distributed ledgers and, more particularly, to methods and systems for activating scripts associated with such distributed ledgers. The invention is particularly suited, but not limited to, activating such scripts based on information not available on the distributed ledger.

In this document we use the term 'block-chain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference and unspent transaction outputs (UTXO). Validation may be performed by executing its locking and unlocking scripts. If execution of the locking and unlocking scripts evaluate to TRUE and, if certain other conditions are met (such as inclusion of a sufficient mining fee), the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing etc.) while being more versatile in their applications.

Blockchain technology has been used to provide a platform for smart contracts. Smart contracts are computerized transaction protocols that execute the terms of a contract. When implemented on a blockchain, a smart contract is a computerized protocol that is stored on the blockchain and that is triggered by blockchain transactions and which, when executed, may cause data to be written to the blockchain. When implemented on a blockchain, the smart contract may be visible to all users of the blockchain network.

Smart contracts must often be activated by a message or transaction. That is, the smart contract must typically be poked by an external agent for the code to be executed. Further, smart contracts do not typically have access to information that is outside of the blockchain itself. Without access to such information, the smart contract may not be able to determine which clauses of a contract are to be executed/enforced. In order to obtain such external information, a trusted external agent is sometimes used to provide access to information that is outside of the blockchain and that is required by a smart contract. Reliance on trusted external agents reduces the autonomy and self-enforcing nature of smart contracts. Reliance on trusted external agents can reduce the security and usability of smart contracts.

Thus, in accordance with e present invention there is provided a method as defined in the appended claims.

As will be described in greater detail below, a congress may be formed on a blockchain network. A congress may be an open-membership group which may be joined by any node in the blockchain network upon submission of sufficient stake to a pool associated with the congress. For example, a node may join a congress through transfer of a digital asset, such as digital currency (such as bitcoin), tokens or other stake or value, to an account associated with the congress. Advantageously, the congress may be used to securely activate a script, such as a smart contract. For example, the congress may be used to reliably provide data from an external source to the script. The congress may be used to securely reach consensus in a distributed system in which messaging between nodes is insecure. For example, the congress may reliably provide data from an external source to a script and the data may be provided securely even though communications between nodes in the congress may not be secure.

Therefore, in accordance with the invention there may be provided a computer-implemented method. The computer-implemented method may include: i) broadcasting a transaction, by a node in a blockchain network, to a congress pool to join a congress formed of a group of nodes; ii) after the congress has accepted a request from a requester to activate a script, preparing, by the node, a transaction payable to the congress pool, the transaction configured to permit a plurality of information providing systems to add inputs to the transaction; iii) after the inputs have been added to the transaction, cooperatively generating, by the node in cooperating with other nodes of the group, a valid signature for the transaction to spend the transaction; iv) after the transaction has been spent, receiving data from the plurality of information providing systems; v) determining a centre point for the data received from the plurality of information providing systems; and vi) activating, by the node in cooperation with other nodes of the congress, the script based on the centre point.

In some implementations, there is provided a computer-implemented method. The computer-implemented method may include: i) broadcasting a transaction, by a node in a blockchain network, to a congress pool to join a congress formed of a group of nodes; ii) after the congress has accepted a request from a requester to activate a script, preparing, by the node, a blockchain transaction cryptographically locked with a public key associated with the congress, the blockchain transaction configured to permit a plurality of information providing systems to add inputs to the blockchain transaction; iii) after the inputs have been added to the blockchain transaction, cooperatively generating, by the node in cooperating with other nodes of the group, a valid cryptographic signature for the blockchain transaction to unlock the blockchain transaction; iv) after the transaction has been unlocked, receiving data from the plurality of information providing systems; v) determining a centre point for the data received from the plurality of information providing systems; and vi) activating, by the node in cooperation with other nodes of the congress, the script based on the centre point.

In some implementations, the computer-implemented method includes: i) based on the centre point, identifying, by the node, a subset of the information providing systems that provided data proximate the centre point; and ii) authorizing, by the node in cooperation with other nodes of the group, a transfer of digital assets (i.e., a token) to each information provider in the subset (i.e., to each information providing system in the subset).

In some implementations, the digital assets (i.e., the token) included in the transfer include one or more digital assets (i.e., the tokens) received from the requestor into the congress pool. In some implementations, the request includes a threshold indicator and wherein the subset is identified based on the threshold indicator. The threshold indicator may be received from the requester.

In some implementations, the inputs to the transaction (i.e., the inputs to the blockchain transaction) include respective proof of solution data and the method includes determining that the data received from at least one of the information providing system corresponds with a committed solution based on the proof of solution data.

In some implementations, the inputs to the transaction (i.e., the inputs to the blockchain transaction) include respective proof of solution data and the method further includes: i) determining that the data received from at least one of the information providing systems does not correspond with the proof of solution data received from that information providing system; and ii) in response to determining that the data received from the at least one of the information providing systems does not correspond with a committed solution based on the proof of solution data, discarding the data.

In some implementations, the inputs to the transaction include digital assets (i.e., tokens) to be held as a security deposit (i.e., to be locked for security).

In some implementations, the information providing systems include, in the transaction (i.e., in the blockchain transaction), a hash based on a public key, a solution to the request and salt and, in some implementations, the data received from the plurality of information providing systems includes the public key, the solution to the request and the salt. The method may further include: i) generating a hash based on the public key, the solution to the request and the salt; and ii) comparing the generated hash with the hash included in the transaction (i.e., in the blockchain transaction).

In some implementations, the computer-implemented method further includes: i) detecting malicious activity by a malicious party, wherein the malicious party is one of the nodes of the congress; and ii) using the private key share to confiscate at least a portion of digital assets (i.e., tokens) previously transferred to the congress pool by the malicious party. Confiscating may comprise transferring to an unspendable account.

In accordance with the invention, there may be provided an electronic device. The electronic device includes an interface device, a processor coupled to the interface device and a memory coupled to the processor. The memory has stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

These and other aspects of the present invention will be apparent from and elucidated with reference to, the embodiment described herein. An embodiment of the present invention will now be described, by way of example only, and with reference to the accompany drawings, in which.

BLOCKCHAIN NETWORK

Figure 1:
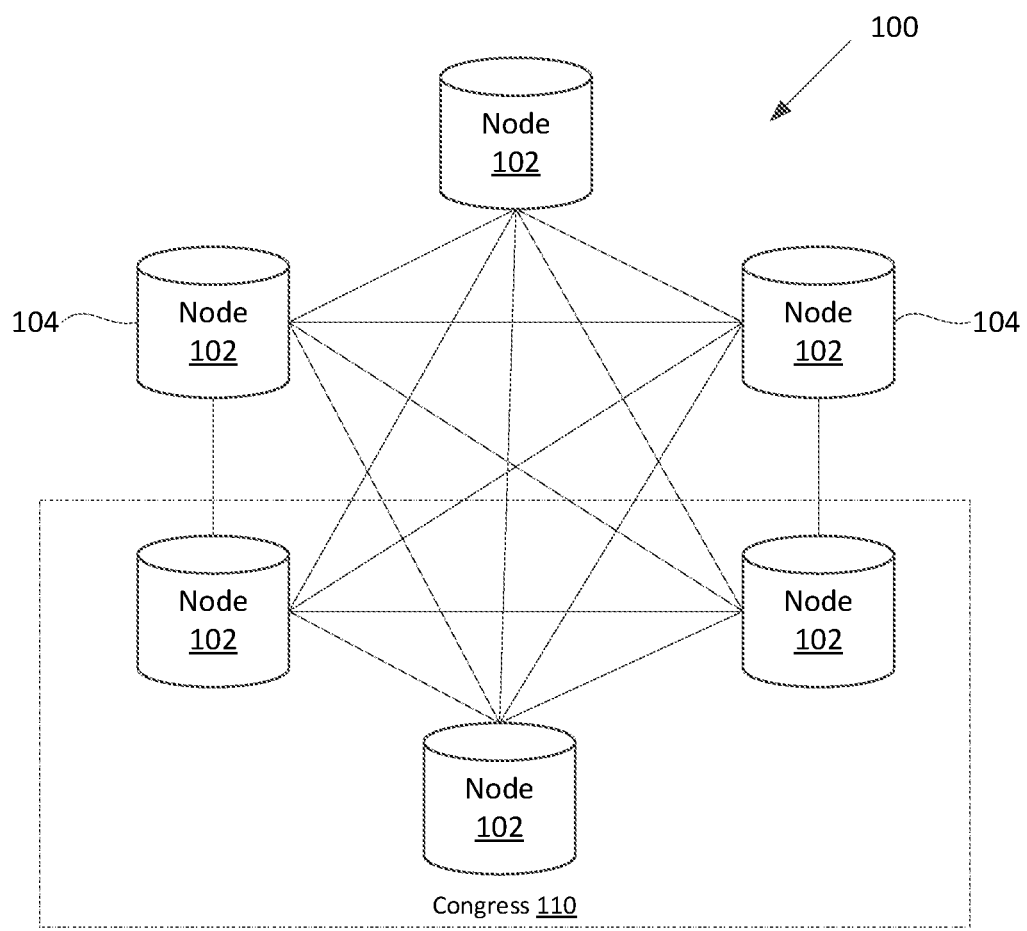
FIG. 1 illustrates a block diagram of an example blockchain network.

Reference will first be made to FIG. 1 which illustrates, in block diagram form, an example blockchain network 100 associated with a blockchain. The blockchain network may be a public blockchain network, which is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. Such communication adheres to the protocol associated with the blockchain. For example, where the blockchain is a bitcoin blockchain, the bitcoin protocol may be used.

Nodes 102 maintain a global ledger of all transactions on the blockchain. Thus, the global ledger is a distributed ledger. Each node 102 may store a complete copy or a partial copy of the global ledger. In the case of a blockchain secured by proof-of-work, transactions by a node 102 affecting the global ledger are verified by other nodes 102 so that the validity of the global ledger is maintained. When the blockchain is a proof-of-work based blockchain, blocks are also verified by checking the proof-of-work submitted with the block.

At least some of the nodes 102 operate as miners 104 of the blockchain network 100. The blockchain network 100 of FIG. 1 is a proof-of-work block chain in which miners 104 perform expensive computations in order to facilitate transactions on the blockchain. For example, the proof-of-work blockchain may require miners to solve a cryptographic problem. In Bitcoin the miners 104 find a nonce such that a block header hashes, with SHA-256, to a number that is less than a value defined by the current difficulty. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The block is added to the blockchain (i.e., to the distributed global ledger) by consensus of the nodes 102.

The block created by the miner 104 includes transactions which had been broadcast to the block chain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to spend the Bitcoin) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring digital assets to or from a public key (e.g., paying into the public key) and transferring digital assets to or from the address associated with that public key refer to a common operation.

Some of the nodes 102 may not operate as miners and may, instead, participate as validating nodes. Validation of transactions may involve checking signature(s), confirming reference to valid UTXO, etc.

The example of FIG. 1 includes five nodes 102, three of which are participating as miners 104. In practice, the number of nodes 102 or miners 104 may be different. In many blockchain networks, the number of nodes 102 and miners 104 may be much greater than the number illustrated in FIG. 1.

As will be explained below, various nodes 102 may cooperate to form a group which will be referred to herein as a congress 110. In the example illustrated, three nodes 102 are shown as taking part in the congress 110. However, the actual number of congress 110 members may be much larger.

The congress 110 is an open-membership group which may be joined by any nodes 102 upon submission of sufficient stake to a pool associated with the congress 110. For example, a node may join a congress through transfer of a digital asset, such as digital currency (such as bitcoin), tokens or other stake or value, to an account associated with the congress 110. A node 102 joining a congress may be any node in the blockchain network including both mining and non-mining nodes. In at least some applications of a congress, a node acting as a congress member monitors the blockchain in the sense that they download (but not necessarily retain) the full blockchain.

Techniques for joining, leaving and participating in a congress 110 will be discussed in greater detail below.

Electronic Device Operating as a Node

Figure 2:
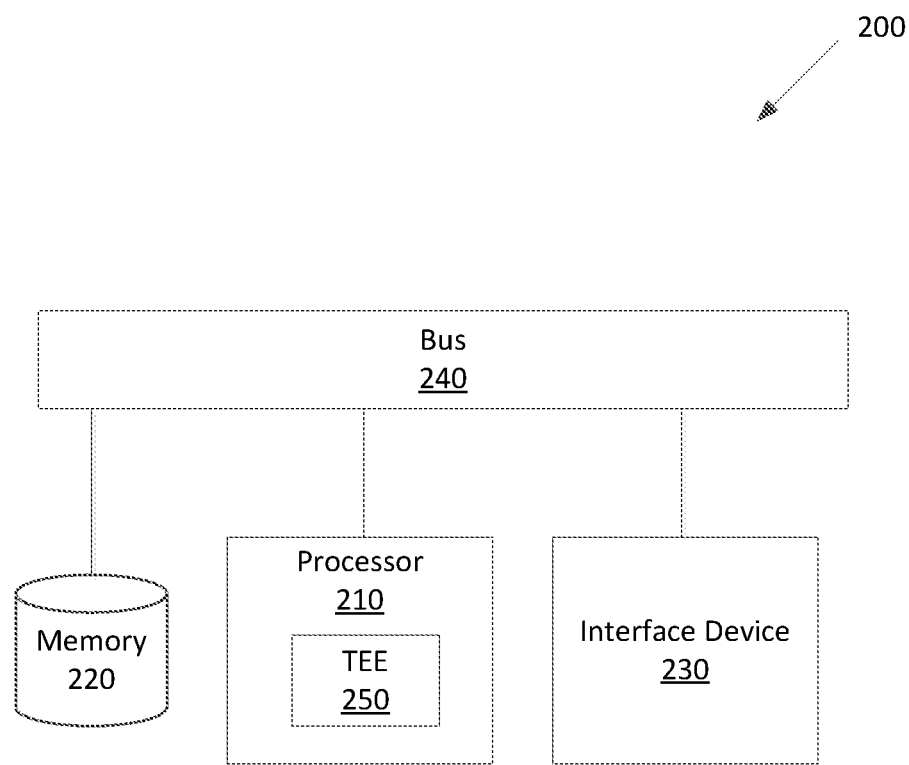
FIG. 2 illustrates a block diagram of an example electronic device which may function as a node in a blockchain network.

FIG. 2 is a block diagram illustrating components of an example electronic device 200 which may serve as a node 102 (FIG. 1) in a peer-to-peer blockchain network 100 (FIG. 1). The example electronic device 200 may also be referred to as a processing device. The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with the blockchain network 100 (FIG. 1). For example, the instructions may include instructions for implementing the Bitcoin protocol.

The memory 220 may store the global ledger of the blockchain network 100 (FIG. 1) or a portion thereof. That is, the memory 220 may store all blocks of the blockchain or a portion of the blocks, such as the most recent blocks, or a portion of the information in some blocks.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 may include a secure area such as a Trusted Execution Environment (TEE) 250. The TEE 250 is an isolated execution environment which provides additional security to the electronic device 200 such as isolated execution, integrity of Trusted Applications and asset confidentiality. The TEE 250 provides execution space which guarantees that the computer instructions and data loaded inside the TEE 250 are protected in terms of confidentiality and integrity. The TEE 250 may be used to protect the integrity and confidentiality of important resources, such as keys. The TEE 250 is implemented, at least in part, at a hardware level so that instructions and data executed within the TEE 250 are protected against access and manipulation from the rest of the electronic device 200 and from external parties such as the owner of the electronic device. The data and computations within the TEE 250 are secured from the party operating the node 102 that includes the TEE 250.

The TEE 250 may operate to instantiate an enclave and then add pages of memory one at a time, while cumulatively hashing. A similar operation may also be performed on a remote machine (which may be a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it is locked down. It is possible to run the code in the TEE 250 and to send secrets to the code, but the code cannot be changed. A final hash may be signed by an attestation key and may be made available to a data owner to verify it before the data owner sends any secrets to the enclave.

The TEE 250 may be used to protect the confidentiality and integrity of a private key share associated with a congress public key used by the congress 110 (FIG. 1). For example, the TEE 250 may be used for the generation and storage of private key shares. The TEE 250 is intended to ensure that no member is able to directly obtain the private key share held within the TEE 250 enclave, or information about other private key shares from inter-member communication or inter-enclave communication. The protocol is also robust against the compromise of a threshold of enclaves. Further, the TEE 250 may enable remote attestation which may be used by a node 102 (FIG. 1) to prove to other nodes 102 that a TEE 250 is authentic and is running approved computer executable instructions for a protocol that is implemented by a congress 110. Remote attestation may be provided by the TEE 250 by running a particular piece of code and sending a hash of the code, internal to the enclave, signed by an internal attestation key for the enclave.

The TEE 250 may be used to attest to secure deletion of the private key share when a member of a congress 110 who has previously used the private key share on the electronic device 200 has chosen to leave the congress. The electronic device 200 may provide attestation of deletion to other congress members through a remote attestation protocol provided in the TEE 250. Attestation of deletion may be required before a member is permitted to withdraw their member deposit. That is, return of the deposit may be conditional on attestation to deletion of the private key share held within the member's enclave.

The TEE 250 may be equipped with a secure random number generator, which is internal to an enclave of the TEE, which can be used to generate private keys, random challenges, or other random data. The TEE 250 may also be configured to read data from external memory and may be configured to write data to the external memory. Such data may be encrypted with a secret key held only inside the enclave.

The TEE 250 may be implemented using various platforms such as Trusted Platform Module (TPM) or Intel Software Guard Extensions (SGX). SGX, for example, supports remote attestation, which enables an enclave to acquire a signed statement from the processor that is executing a particular enclave with a given has of member known as a quote. A third-party attestation service such as Intel Attestation Service (RS) may certify that these signed statements originate from authentic CPUs conforming to the SGX specification.

The electronic device 200 acts as a node 102 (FIG in the blockchain network 100 (FIG. 1) and may join and otherwise take part in a congress 110 (FIG. 1). A congress 110 is formed when a group of digital asset bearers pool digital assets, such as digital currency, tokens or other stake or value supported by the blockchain network 100 (FIG. 1).

Congresses and Threshold Signatures

The congress 110 may be a permissioned or non-permissioned group. That is, the congress 110 may be joined by any node 102 (FIG. 1) in the blockchain network 100 (FIG. 1) (i.e., by any node that monitors and stores at least a portion of the information in the blockchain). To join the congress 110, a node 102 transfers one or more digital assets to a digital asset pool associated with the congress 110 (i.e., to a public group address associated with one or more digital assets which are, in turn, associated with other members of the congress). This digital asset pool may be referred to as a congress pool. For example, a node 102 may join a congress 110 by transferring (i.e., depositing) such digital assets to an address associated with the congress pool (i.e., to a "congress address" which may also be referred to as a public group address). The digital assets are placed under the control of a group threshold signature with a single public key, referred to as a congress public key. Congress members hold distributively-generated private key shares. The number of shares held may be in proportion to the amount deposited in the pool.

The digital assets that are controlled by the congress 110, which include any digital assets transferred to the congress address, are placed under the control of a threshold signature scheme. Under the threshold signature scheme, a group of members whose total private key share-holdings exceed a threshold are needed to produce a valid signature which allows the digital assets to be transferred away from control of the congress 110. That is, at least a threshold number of private key shares must be used to generate a valid signature for any outgoing transfer of digital assets controlled by the congress 110.

The congress public key encumbers the digital assets deposited in the congress pool by the members of the congress 110 in return for private key shares, and any digital assets deposited to the address associated with the congress pool (i.e., placed under full, partial or conditional control of the congress) by members or non-members of the congress 110 which have been deposited for reasons other than obtaining private key shares. Non-members or members may deposit digital assets to the address associated with the congress for various reasons. In one example which is explained in greater detail below, members or non-members may deposit digital assets to the congress 110 to move such assets to another blockchain, which may be referred to as an alternative chain (alt-chain), such as a sidechain. The sidechain may be a blockchain that runs in parallel to a main blockchain (i.e., parallel to the mainchain).

Since the same congress public key may control both member deposits (i.e., digital assets provided by congress members in return for private key shares) and digital assets provided by members or non-members for other purposes, at least some deposits to the address associated with the congress may be specially flagged to indicate the type of deposit. For example, a transaction that transfers the digital asset to the congress address may include a flag, identifier or other attribute which indicates the nature of the deposit being made. By way of example, a transaction that transfers the digital asset to the congress address that is not made for the purpose of joining a congress or boosting a stake in congress membership may include a special identifier to indicate that the deposit is being made for another purpose. Such identifiers may be used by nodes 102 associated with the congress 110 when managing private key generation. More particularly, nodes 102 which deposit digital assets for the purpose of joining the group are allocated private key shares for the congress 110 (as a result of making the deposit of digital assets) while other nodes 102 which deposited digital assets for other purposes (e.g., to transfer to a sidechain) may not hold congress private key shares for the congress (i.e., corresponding to the congress public key).

The congress 110 may act as a self-governing group in which cooperative behaviour is enforced through the threat of confiscation of all or part of the member deposit. Noncooperative or malicious members may have such digital assets confiscated by participation in a cooperative protocol by a number of honest members. That is, to ensure that all nodes 102 operate in conformity with the pre-defined protocol or criteria, member deposits into the congress pool may be subject to confiscation. Confiscation means permanently preventing the return of a member deposit that is deemed confiscated. The digital asset(s) that form the member deposit which are not returned due to the malicious activity may be left in the congress pool but not returned (e.g., if a consensus has been reached (on an alt-chain) that they should not be returned), transferred immediately or in the future to another unspendable address, or otherwise confiscated and the nature of confiscation may depend on whether the congress functions as a bonded validator set for a sidechain.

Further, when a congress member wishes to leave the congress 110, they may withdraw their member deposit (i.e., request that the congress 110 transfer the member deposit back to that member's personal address). However, withdrawal of funds is only performed if a number of private key shares exceeding a threshold required to generate a valid digital signature are used by members of the group (i.e., the congress) to approve the withdrawal.

The threshold signature scheme implemented by the congress 110 may be of various types. The threshold signature scheme allows sharing of signing power between n parties as long as at least a threshold number of private key shares have contributed towards generating a valid signature. Any subset smaller than the threshold cannot generate a valid signature. More particularly, each of the parties controls a share of a private signing key and a threshold number of key shares must be used to generate a valid signature through the combining of partial signatures. Any subset of key shares that is less than the threshold cannot generate a valid signature.

The threshold signature scheme may be an Elliptic Curve Digital Signature Algorithm (ECDSA) scheme. For example, an ECDSA scheme may be of the type proposed by Ibrahim et al. in "A robust threshold elliptic curve digital signature providing a new verifiable secret sharing scheme", 2003 EIII 46th Midwest Symposium on Circuits and Systems, 1:276-280 (2003). This threshold signature scheme is an extension of a digital signature scheme which is an elliptic curve cryptography-based algorithm in which t+1 key shares from a party of n key share-holders are required to reconstruct a private key. The scheme may be used to construct a valid signature without having to reconstruct a private key and without any party having to reveal their key share to another party.

Since t+1 key shares are sufficient to reconstruct the secret, the maximum number of permissible adversaries according to this technique is t. An adversary, in the model of Ibrahim et al., is an entity who has corrupted a party holding a secret share and has access to that secret share. Adversaries can be of various types. For example, a Byzantine adversary is an adversary who may pretend to participate in a protocol while they are, in fact, sending incorrect information. The ECDSA scheme proposed by Ibrahim is robust against up to t<=n/4 malicious adversaries. This robustness could rise to t<=n/3, but at the cost of greater complexity.

The ECDSA scheme of Ibrahim et al. is robust against halting t<=n/3 halting adversaries. A halting adversary is able to prevent a corrupted party from participating in a protocol or halt participation part-way through.

This ECDSA scheme includes various mechanisms which could be used by the nodes 102 to identify a malicious or uncooperative party. For example, verifiable secret sharing (VSS) may be used to share a polynomial required for Shamir's Secret Sharing (SSS). SSS is a form of secret sharing in which a secret is divided into parts and provided to each participant in its own unique part. These parts may be used to reconstruct the secret. VSS may be used, by the nodes 102, to identify a malicious node 102 or member if inconsistent shares are provided to different nodes 102 or if a share is secretly sent to a node that is different than the blinded share which is broadcast to all nodes. Inconsistent shares may be identified by any one of the nodes 102. The sharing of the secret may be made verifiable by including auxiliary information which allows nodes 102 to verify their shares as consistent.

The sending of an incorrect share to an individual node (i.e., a share that is different than the blinded share that is broadcast) can be identified by the intended recipient node of the share. The identification of an incorrect share being secretly sent to a node can be rendered publicly verifiable using techniques of Publically Verifiable Secret Sharing (PVSS). Such techniques may avoid a possible delay in the identification of a cheating sender which might occur where PVSS is not used and a recipient of an incorrect share is off line or cut off from a substantial fraction of the network when the incorrect share is sent.

Misbehaviour, such as providing inconsistent shares to different nodes, may be addressed by a congress 110 to deter malicious behaviour. For example, when a node 102 (FIG. 1) is identified by other nodes 102 as a malicious party, a number of nodes 102 (i.e., nodes associated with congress members) exceeding a threshold (e.g., t+1) may cooperate to penalize the malicious party. For example, the nodes 102 may take action involving a digital asset (such as digital currency, tokens or other stake or value) deposited to the congress by the malicious party. For example, the congress may burn the digital currency, tokens, stake or value by transferring them to an unspendable address or the congress may confiscate such digital assets by coming to a consensus with other nodes to refuse to authorize their return to the malicious party. The nodes 102 that are not a misbehaving node may also deter misbehaviour by cooperating to exclude a misbehaving node (e.g., by effectively invalidating key shares; for example, by excluding a node from participating in the congress protocol, or by re-sharing the private key and not allocating the misbehaving node a share).

The ECDSA technique described above may be enhanced through the use of a TEE. For example, the threshold ECDSA signature technique based on Ibrahim et al. contemplates a strong form of adversary, referred to here as a Byzantine adversary. This type of adversary may behave arbitrarily, for example, they not only refuse to participate in the signing process or halt party way through, but may also pretend to honestly participate and send incorrect information. However, by using TEEs, and producing the data used for signing within an enclave of a TEE where a secret private key share is stored, additional security may be provided since it is highly unlikely that enclaves could be compromised in significant numbers. If each TEE is allocated no more than one key share, for example, the number of possible compromised TEEs could reasonably be expected to not approach the threshold for robustness against Byzantine adversaries, assuming n to be sufficiently large. This allows the protocol to be secure if it is tolerant to a small proportion of malicious adversaries relative to the total number of key shares.

For example, if all nodes have TEEs, acquisition of a secret stored within an enclave could only be achieved with physical access to a node and only at great effort and expense, provided the manufacturer of the TEE is not corrupted. Such manufacturer-level corruption is expected to be manageable. For example, if a manufacturer were to falsely claim that a number of public keys correspond to genuine TEEs, they could gain direct access to private key shares and potentially launch an attack. However, such an attack would require a sufficient number of key shares to allow the manufacturer to produce a valid signature without assistance from other nodes. This would mean accumulating a large portion of the total stake, which would be quite expensive. Moreover, by carrying out the attack, a large percentage of the value of the stake holding would be destroyed.

When TEEs are used, it is useful to contemplate the robustness of the protocol to "corrupted nodes". A corrupted node is a node such that the hardware external to the TEE is corrupted, but the integrity of the TEE is not compromised. A corrupted node may have control over what information the enclave receives and does not receive. In particular, a corrupted node may halt i.e., refrain from participation in the protocol. If information provided to the protocol is required to be signed by a private key held secretly in the enclave (where the corresponding public key was authenticated during attestation) the private key is as trustworthy as the enclave itself. Hence, a corrupted node cannot send arbitrary (authenticated) information to the protocol, and may only attempt to interfere by halting or attempting to fool the enclave into acting improperly, for example, by providing it with outdated information. It follows that, for corrupted nodes, a successful attack would require gathering of a sufficient number of partial signatures to produce a full signature. With TEEs, the protocol of Ibrahim et al. is robust against $2t$ corrupted nodes. Because a signature can be produced if $n-2t>2t+1$, any qualified subset of key shares of size $2t+1<=(n+1)/2$ is sufficient. Accordingly, when TEEs are used, a threshold for the threshold signature scheme may be configured to be a number that is greater than or equal to 50% of the key shares to produce a valid signature in the presence of corrupted nodes.

Other threshold signature schemes may also be used. For example, the threshold signature scheme may be an ECDSA threshold scheme of the type proposed by Goldfeder et al., "Securing Bitcoin Wallets Via a New DSA/ECDSA threshold signature scheme", (2015). This protocol allows $t+1$ parties to produce a valid signature. Consequently, the number of key shares an adversary has to control to produce a valid signature is equal to the number of key shares an adversary has to possess to reconstruct the private key. This technique can provide an efficient scheme in the case in which unanimity is required to produce a valid signature. In the most general case, this scheme imposes space requirements that scale exponentially with the number of congress members since, for an arbitrary threshold one needs to repeat the whole protocol for any possible subset of $t+1$ players out of n. Thus, for large values of both n and t, a large number of key shares will need to be stored. To mitigate such storage requirements, standard bitcoin multi-signatures could be combined with threshold signatures. In particular, digital assets could be locked using multi signature so that each private key is divided into shares. This technique would make larger congresses more efficient in terms of space requirements. Scaling properties may also be improved by composing a scheme for a large number of participants out of smaller party sizes, at multiple levels, in an iterative fashion. For example, the threshold signature scheme could be combined with techniques of Cohen et al., *Efficient Multiparty Protocols via Log-Depth Threshold Formulae* (2013), Advances in Cryptology—CRYPTO 2013 pp 185-202.

Other threshold schemes may be used including non-ECDSA signature schemes. For example, a threshold scheme based on a Schnorr scheme may be used by the nodes 102 to implement the congress 110.

Nodes 102 (FIG. 1) in the blockchain network 100 (FIG. 1) may implement a congress protocol based on the selected threshold signature scheme. Such nodes 102 may include computer-executable instructions stored in memory 220 (FIG. 2) which implement the congress protocol. Such instructions, when executed by a processor 210 (FIG. 2), cause a node 102 (such as an electronic device 200 of the type described with reference to FIG. 2) to perform one or more methods of the congress protocol. Such methods may include any one or combination of the methods 300, 400, 500, 600, 700, 800, 1000 of FIGS. 4 to 8 and 10. Thus, the congress protocol may include one or more of the methods 300, 400, 500, 600, 700, 800, 1000 of FIGS. 4 to 8 and 10. The methods may be performed by a node cooperatively with other nodes associated with other congress members.

Congress Initiation

Figure 3:
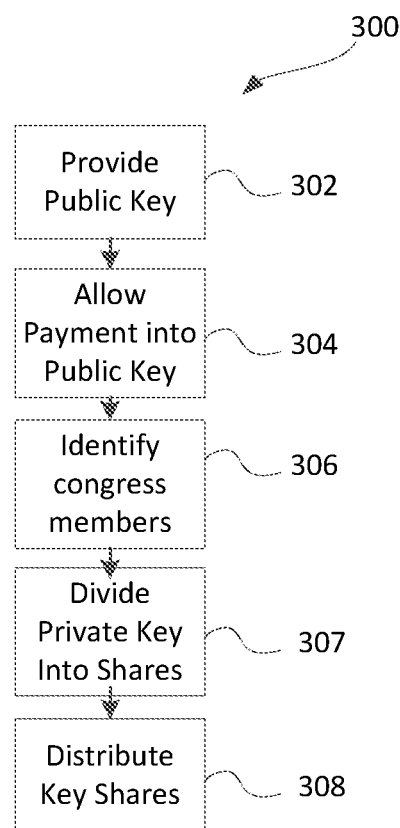
FIG. 3 is a flowchart of an example method of initiating a congress.

Referring now to FIG. 3, a method 300 of initiating a congress 110 is illustrated. The method 300 may be performed by an initially trusted party to set up the congress 110. That is a node 102 associated with the initially trusted party may perform the method 300.

The method 300 includes, at operation 302, providing a congress public key. The congress public key may be provided to other nodes 102 to allow the other nodes to pay into the congress public key if they wish to join the congress. That is, others may transfer digital assets to an address associated with the congress public key in order to join the congress.

The node 102 performing the method 300, at operation 304, allows payment into the public key until one or more conditions are satisfied. For example, the node may allow payment into the public key for a determined period of time or for a determined number of blocks. After the condition is satisfied (e.g., after expiration of this period of time or mining of the number of blocks), the node 102 performing the method 300 identifies, at operation 306, initial members of the congress.

After the parties who will comprise the initial membership of the congress are identified, a private key is divided into private key shares according to a threshold signature scheme at operation 307. The private key shares are then distributed, at operation 308, from the node 102 performing the method 300 to the identified parties. The private key shares are associated with a threshold signature scheme, which may be of the type described herein.

During operation 308, the nodes 102 that are identified as congress members cooperate to generate new private key shares and a new public key. The original key shares that were sent to such nodes by the initially trusted party may be used to sign and broadcast a transaction to send all digital assets in the congress pool to the new public key, which then becomes the congress public key. That is, during operation 408, a new group public address is established and the digital assets under control of the congress are transferred to this new address, which becomes the new address for the group and which is associated with the congress public key. After this transfer is confirmed, the congress can operate trustlessly. The new group public address is formed into which deposits of digital assets may be received in the future from other nodes wishing to join the congress 110, or for other purposes as described above. The congress members are now considered to be enrolled in the congress and these nodes can now operate without the aid of the initially trusted party. Moreover, the initially trusted party no longer plays any part in the operation of the congress.

Joining a Congress After the Congress Has Been Initiated

Figure 4:
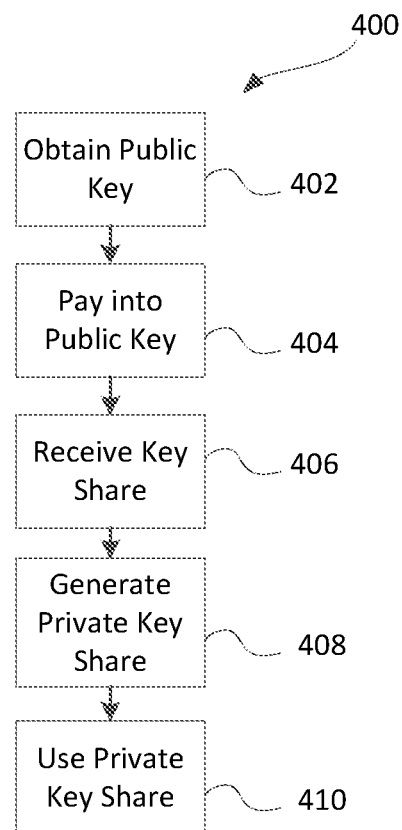
FIG. 4 is a flowchart of an example method of joining a congress.

Reference will now be made to FIG. 4 which illustrates a method 400 of joining a congress. The method 400 of FIG. 4 may operate in conjunction with the method 300 of FIG. 3, but the method 400 of FIG. 4 is performed by a different one of the nodes 102 operating in the same blockchain network 100 (FIG. 1) in which the node performing the method 300 of FIG. 3 operates. The method 400 of FIG. 4 includes, at operation 402, obtaining a congress public key. The congress public key may be obtained directly from the party initiating the congress, such as the node performing the method 300 of FIG. 3, or it may be obtained from a third party including, for example, a third party system operating outside of the blockchain network 100 (FIG. 1). For example, the congress public key may be obtained from a public web server accessible over the public Internet.

The node 102 performing the method 400 pays into the congress public key at operation 404 by broadcasting a transaction of digital assets from a private account associated with the node 102 to a congress address (i.e., an address associated with the congress public key). More particularly, the node 102 broadcasts a transaction to transfer one or more digital assets to a public group address that is associated with the congress public key. The public group address is the address for a congress pool. The congress pool includes other digital assets associated with the other members of a congress. Thus the transaction at operation 404, once added to a block by a miner 104 (FIG. 1), transfers the digital asset to the congress pool which includes digital assets from other members. The public group address may receive both transfers from parties wishing to join the congress and transfers from parties not wishing to join the congress. The parties who do not wish to join the congress transfer the digital assets to the congress pool so that such digital assets may be placed under total, partial or conditional control by the congress using a threshold signature scheme employed by the congress.

The transaction at operation 404 may include a flag, identifier or other attribute which indicates that the party transferring the digital asset wishes to join the congress and that the deposit is being made for such purpose.

After depositing the digital assets with the congress pool, the node 102 performing the method 400 receives, at operation 406, a private key share. Then, the node 102 regenerates the private key share at operation 408 by running a single instance of the protocol. The generation of a private key share may be performed within a TEE of the node 102.

At operation 408, the node 102 generates a private key share that is to be used in a threshold signature scheme in which at least a threshold of private key shares must be used to generate a valid signature for a transaction on behalf of the congress. Other holders of private key shares are the other members of the congress who have joined the congress on a permissioned or non-permissioned basis by transfer of respective digital assets to the public group address.

To regenerate the private key shares, at operation 408, the existing congress members may cooperate to update the key shares. For example, a node 102 may generate a random polynomial of order t and with the constant term zero a $f_{n+1}^0(x)$. The node 102 may then calculate the point $f_{n+1}^0$ (n+1) and set this as their private key share. The node 102 may then distribute the points on this polynomial $f_{n+1}^0(i)$ to each of the existing congress members, i=1, . . . , n. Each existing congress member (i=1, . . . , n) then adds the received value to their existing private key share to obtain the new private key share. The node 102 now has a private key share equivalent to all other members and the corresponding public key remains unchanged. As described above, the threshold signature scheme may be of various types including an Elliptic Curve Digital Signature Algorithm or a threshold scheme based on a Schnorr scheme.

The private key share may be generated within a TEE 250 (FIG. 2) and may be securely stored on the node 102. For example, the private key share may be stored in the TEE 250.

After the private key share is generated by respective nodes, finds under control of the previous congress public key (e.g., funds transferred to the public group address that is associated with the original congress public key) may be transferred (through cooperation of a number of group nodes sufficient to generate a valid signature under the threshold signature scheme) to a new congress public key associated with the new private key shares.

After the private key share is generated at operation 408, it may be used at operation 410 of the method 400. The private key share may be used to cooperatively generate a valid signature for a transaction from the public group address which may be broadcast by a member. That is, the private key share may be used in the threshold signature scheme to contribute towards signature generation. Under the threshold signature scheme, a threshold number of private key shares of the congress are required to be used by respective members to produce a valid signature which allows the digital assets to be transferred away from the congress. The node 102 performing the method 400 may retrieve the private key share from storage and use the private key share in order to contribute towards signature generation. If a sufficient number of other congress members also use their respective private key to contribute towards signature generation, the signature is generated and a valid outgoing transaction may be broadcast. When a miner 104 (FIG. 1) of the blockchain network 100 adds the transaction to a mined block which is added to the blockchain by consensus of the nodes 102 in the blockchain network 100 and the block is confirmed, the outgoing transaction is complete. At this point, the digital assets represented in the transaction may no longer be under the control of the congress. That is, such digital assets may no longer be encumbered by the congress public key.

The use of the private key share at operation 408 may be performed within a TEE of the node 102. The TEE protects the private key share such that other parts of the system nor the member themselves cannot access any data stored in an enclave, such as the private key share. Further, the TEE protects the private key in that it cannot retain a copy of the private key if the member wants their deposit back and receive their deposit back since it must attest to the deletion of the private key before the member deposit is returned.

The method 400 of FIG. 4 may be performed during or after the initial setup phase. That is, the method 400 may be performed before the initial key shares are distributed (e.g., during operation 308 of the method 300 of FIG. 3) or afterward (e.g., during rebalancing, which will be discussed in greater detail below).

The transaction at operation 410 may transfer the digital asset back to the party which originally deposited those digital assets to the congress pool. That is, the transfer may return digital assets to a depositor. The transfer may also transfer the digital asset elsewhere. For example, the digital asset may be transferred to a third party or to an unspendable address.

Confiscation of Digital Asset

Figure 5:
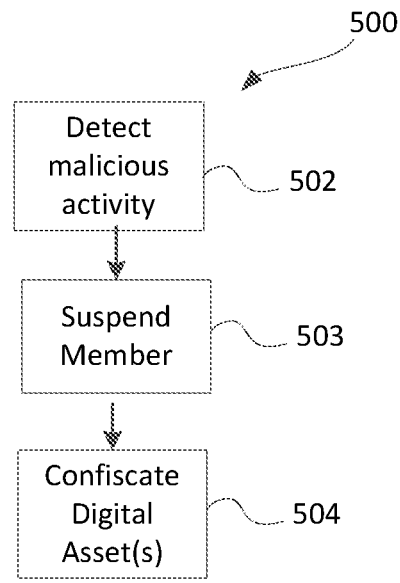
FIG. 5 is a flowchart of an example method of confiscating a digital asset.

Referring now to FIG. 5, an example method 500 of confiscating a digital asset is illustrated. The method 500 of FIG. 5 may be performed by a node 102, which may be the same node performing the method 400 of FIG. 4. The method 500 may be performed after operation 408 of the method 400 of FIG. 4 so that the node 102 already has access to a private key share when the method 500 of FIG. 5 is performed.

At operation 502, the node 102 detects malicious activity by a malicious party. The malicious party may be another member of the congress. Malicious activity is detected when the node 102 determines that a member of the congress is in breach of a pre-defined protocol or criteria. For example, when a node which is a member in the congress reports faulty information (i.e., false, inconsistent or otherwise unacceptable information) to other members of the congress, the member may be deemed to be a malicious member.

At operation 503, in response to detecting malicious activity, the node 102, in cooperation with other nodes in the congress, may suspend the member that is the malicious party. That is, the congress may exclude the malicious party from further participation in the congress.

To ensure that all nodes 102 operate in conformity with the pre-defined protocol or criteria, member deposits into the congress pool may be subject to confiscation. Confiscation means permanently preventing the return of a member deposit that is deemed confiscated. The digital asset(s) that form the member deposit which are not returned due to the malicious activity may be left in the congress pool but not returned (in response to a consensus that that this action should be taken), transferred immediately or in the future to another unspendable address, or otherwise confiscated and the nature of confiscation may depend on whether the congress functions as a bonded validator set for a sidechain. For example, at operation 504, in response to detecting malicious activity by a malicious party, the node 102 performing the method 500 may use the private key share to provide a partial signature on a confiscation transaction (which is a transaction that transfers digital assets to an unspendable address or to another node as a reward for exposing malicious activity). That is, the node cooperates with other nodes of the congress to confiscate at least a portion of the digital assets that were previously transferred to the public group address (i.e., to the congress pool) by the malicious party. That is, in response to observing that the group member is in breach of the pre-defined protocol or criteria, the private key share is utilized to contribute to the authorization of a transaction of one or more digital assets that are associated with that group member and that are held in the congress pool.

Since a threshold signature scheme is used with the congress public key, an individual node acting alone cannot transfer another congress member's deposit of digital assets away from the congress pool (e.g., to an unspendable address). Rather, the digital assets can only be confiscated by transfer when a threshold number of private key shares are used by their respective members to generate a valid signature to transfer the digital asset(s) to another address or when a group of members having at least a threshold number of private key shares reach consensus to suspend a member (at operation 503), which causes any withdrawal request from the suspended member to be automatically ignored. When digital assets are confiscated by transfer, the other address to which the digital asset(s) may be transferred may be associated with an unspendable address. For example, the other address may be an address for which no private key exists so that no party can access the digital assets bound by the public key for the address. When a transaction that transfers digital assets to the unspendable address is confirmed or when consensus is reached on a sidechain that digital assets should be confiscated, the digital assets may be considered to have been burned, since they are no longer spendable by any members of the congress or indeed by any nodes in the blockchain network 100.

Accordingly, at operation 504, the node may confiscate the digital asset by using the private key share in cooperation with other members of the congress to generate a valid signature for the transaction to the unspendable address and in some implementations may involve achieving consensus, on a second blockchain, that a member should be permanently deprived of all or part of their deposit.

Further, in some implementations, a congress may serve as a bonded validator set, securing a proof-of-stake sidechain, and this sidechain may be used as a broadcast channel. For example, a consensus may be reached by the congress members on the sidechain that a member has acted maliciously. This consensus could correspond to confirmation of a sidechain transaction containing incriminating evidence of the malicious activity. When consensus is reached, any request to withdraw a member deposit, made by the malicious member, will be denied and the deposit is considered to be confiscated. The confiscated digital assets may be burnt at some time in the future. That is, at some time later, a threshold of members (not including the malicious member) may collaborate to authorize transfer of the confiscated digital assets to an unspendable address.

Figure 6:
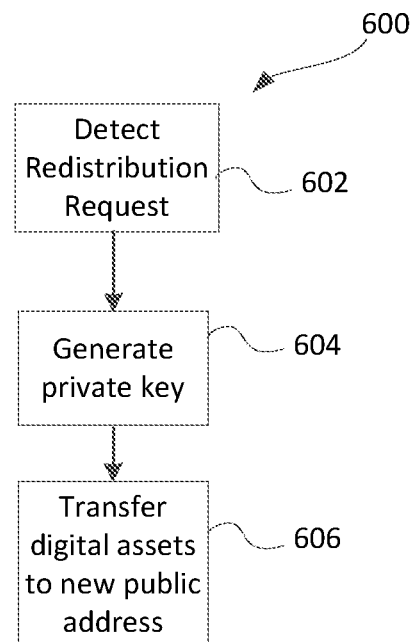
FIG. 6 is a flowchart of an example method of redistributing key shares.

Since the congress is an open group which may be joined by any node 102 of the blockchain network 100 through deposit of digital assets, the group membership may periodically change. When such changes occur, the private key share distributions may be updated. Referring now to FIG. 6, an example method 600 of updating private key share distributions is illustrated. The method 600 may be performed by a node 102 of the blockchain network 100 in cooperation with other nodes of the blockchain network 100.

Updating Private Key Share Distributions Using New Public Address

At operation 602 of the method 600, the node 102 detects a redistribution request, which is a request, the fulfilment of which entails a redistribution of key shares. For example, the node 102 may detect that a prospective new member has transferred digital assets into the public group address or that an existing member has requested withdrawal of a member deposit Digital assets may be transferred to the public group address by nodes requesting to join the congress or increase their participation in the congress and by other nodes who are not requesting to join the congress but are instead transferring the digital assets to the congress for another purpose (such as to transfer the digital assets to a sidechain, as will be described below). At operation 602, the node 102 may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

In response to detecting the request at operation 602, the fulfilment of which, entails the redistribution of key shares, at operation 604, a new private key share is generated by the node 102 in a manner similar to the manner that the private key share was generated at operation 408 of the method 400 of FIG. 4. Other member nodes of the congress also generate respective private key shares. These private key shares may be used with the threshold signature scheme for the new congress public key. Members who will leave the congress at this point do not generate new private key shares during operation 604 and, since they will not be allocated. a private key share for use with the new congress public key, they lose the capacity to take part in the congress and are no longer considered congress members.

Further, in response to detecting a redistribution request (which is a request, the fulfilment of which, entails the redistribution of key shares), at operation 606, the node 102 collaborates with other congress members to transfer all digital assets in the public group address to a new public address associated with a new public key (which will then become the new congress public key).

Thus, according to the method 600 of FIG. 6, when the distribution of deposits changes or when a request is received from a member to withdraw a deposit, private key shares may be regenerated and all of the digital assets under control of the congress may be moved to a new public key. The frequency with which memberships of a congress can be updated is limited by the block time of the blockchain network 100. Many applications may only require rebalancing at low frequencies.

Figure 7:
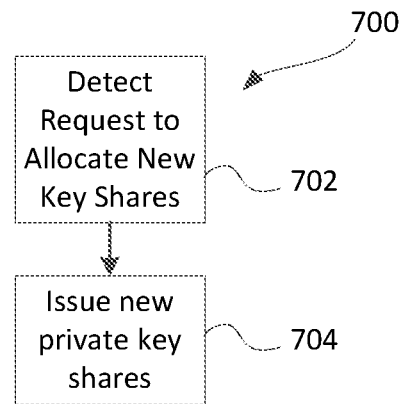
FIG. 7 is a flowchart of a further example method of redistributing key shares.

Updating Private Key Share Distributions While Retaining Existing Public Group Address Referring now to FIG. 7, a further example method 700 of updating private key share distributions is illustrated. The method 700 may be performed by a node 102 of the blockchain network 100 in cooperation with other nodes of the blockchain network 100.

In the method 700 of FIG. 7, the congress public key does not change each time the distribution of member deposits changes. When a request to allocate a new key share is detected (at operation 702, which may occur through deposit of digital assets to the public group address), the node 102 collaborates with other members of the congress to issue (at operation 704) new private key shares for the same public key to the new members of the group. The number of nodes that collaborate is at least the threshold number of nodes required to generate a digital signature under the threshold signature scheme. At operation 704, an additional key share may be allocated while other key shares remain the same. This may entail a change in threshold (of the threshold signature scheme), although the change may in practice be small. Alternatively, at operation 704, an additional key share may be allocated while other key shares are renewed. Such renewal is required to be accompanied by the attestation to deletion of any key shares of the previous generation. In this case, new shares may be allocated while maintaining the same threshold (in the context of SSS, this involves sharing on a new polynomial, of increased order).

At operation 702, the node 102 may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

When members leave a congress which uses the method 700, they may securely delete their private key share. In order to ensure that private key shares of old members are unusable, the members of the congress may be required to use nodes 102 having a special TEE. The TEE is an architecture implemented at the hardware level which guarantees that instructions and data executed within them are protected against access and manipulation from the rest of the system. The TEE may employ hardware mechanisms to respond to remote attestation challenges which can be used to validate the system's integrity to an external party, such as the other nodes in the congress.

Each member node may use a certified TEE configured to generate one or more random secret values which remains inaccessible to the host system without compromising the hardware at the integrated circuit level. Secret values generated in this way would be used in distributed generation of private key shares (e.g., at operation 410 of the method 400 of FIG. 4). This secret value could also be used to establish the shared public key in the set up phase of the congress. Computations associated with the set up protocol are performed within the TEE enclaves so that no member or former member can derive any information about their own or others private key shares from inter-member communication or any other method. The enclaves within the TEES enable a remote attestation protocol to be performed which may be used to prove to other nodes that the TEE enclave is authentic and that it is running approved computer-readable instructions.

Computations associated with group changes are performed within the TEE enclave. For example, the generation of a new secure random secret that may be used in calculating a new polynomial for the purposes of SSS is performed in the TEE enclave.

The TEE enclave also aims to ensure that previous key shares and previous secrets that are no longer to be used are securely deleted before a member deposit can be returned. More particularly, in order to have a member deposit returned, an attestation protocol may require that the TEE enclave attests to the deletion of a key share. Each node 102 may interpret such an attestation as a confirmation that the required deletion has occurred on other nodes through the remote attestation protocol. Thus, the method 700 may also include confirming that a private key share previously held within the TEE of a member who has left the congress has been deleted from a node associated with that member. This confirmation may be performed by receiving attestation of deletion of the private key share. Accordingly, the remote attestation protocol may be used to obtain attestation to the deletion of the private key share previously held in the TEE of a member who has left the congress.

The method 600 of FIG. 6 and the method 700 of FIG. 7 each offer various benefits. For example, the method 600 of FIG. 6 does not rely on secure deletion and does not need to rely on trusted hardware. However, the method 600 of FIG. 6 could benefit from such hardware since, in some circumstances, such hardware may make the malicious pooling of key shares more unlikely.

Figure 8:
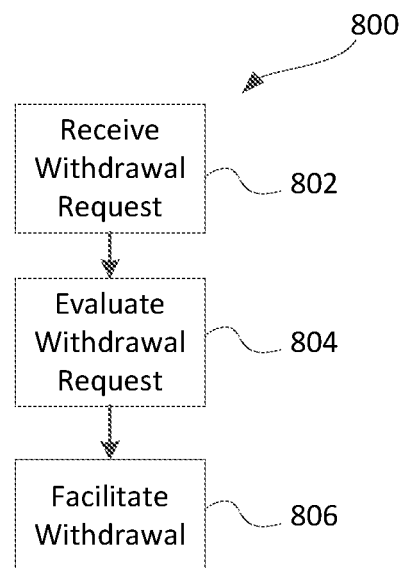
FIG. 8 is a flowchart of an example method of returning a deposit.

The method 700 of FIG. 7 avoids having to relock digital assets under a new congress public key each time the membership changes. Further, in some circumstances the method 700 may update membership faster than the method 600 of FIG. 6 since, under the method 700 of FIG. 7 a transaction does not need to be added to the blockchain to move all digital assets to a new public key because digital assets are not moved to a new public key. That is, the membership may be updated using the method 700 of FIG. 7 without having to wait for several blocks to be generated to confirm transfer of the digital assets to the new public key since the public key does not change Disenrollment From Congress As noted above, group members may occasionally request to leave the congress and, when a group member disenrolls from a congress, the digital assets that they deposited to the congress pool may be returned to them. Referring now to FIG. 8, an example method 800 of returning a deposit is illustrated in flowchart form. The method may be performed by a node 102 in cooperation with other nodes 102 of the congress.

At operation 802 of the method 800, the node 102 receives a withdrawal request from a requestor who is a congress member. The withdrawal request may also be referred to as a disenrollment request. The withdrawal request is a request to withdraw digital assets previously deposited by the requestor and currently controlled by the congress. The request may have been broadcast, by the requestor to all congress members.

In response to receiving the request, the node 102, at operation 804, evaluates the request against determined criteria. Such criteria may be predetermined criteria. If the congress operates according to a congress protocol in which the congress public key is not changed each time group membership changes, then at operation 804, the node 102 may confirm that a private key share has been deleted by the requestor. Such confirmation may be obtained using a remote attestation protocol associated with a TEE.

If the congress protocol is one in which the congress public key is changed when membership changes, the node 102 may not confirm deletion of the private key share since the private key share is no longer effective. Instead, a new congress key may be used and other digital assets under congress control may be transferred to the new congress key.

If the node 102 approves the withdrawal request based on the evaluation, at operation 806 the node facilitates withdrawal of the digital assets. That is, the node 102 uses its private key share to cooperatively generate a digital signature and uses the digital signature to transfer the digital assets previously deposited by the requestor back to the requestor. For example, the digital assets may be sent back to the address from which they were previously received. Operation 806 is performed in accordance with the threshold signature scheme so that the withdrawal is only effected if at least the threshold number of congress members authorize the withdrawal. Operation 806 is performed after the member who desires to disenroll is suspended from activity for a period of time. This waiting period prevents the member from engaging in misbehaviour while the protocol for return of their member deposit is being performed.

Trustless Agents for Smart Contracts

A congress provides a secure mechanism for performing various functions and the congress protocol may be used for a number of different purposes. Generally, the congress operates trustlessly and provides control of ownership over a digital asset.

The congress protocol may, for example, be used to provide a trustless agent for a smart contract. More particularly, the congress protocol may be used to activate a script, such as a smart contract. The activation of the smart contract may "poke" the smart contract, in order to cause one or more functions of the smart contract to be executed or the activation of the smart contract may provide external data to the smart contract. That is, data that is outside of the blockchain network on which the smart contract is executed may be securely obtained and used in conjunction with the smart contract through use of the congress protocol. Accordingly, the congress protocol can be used to provide autonomous activation of blockchain scripts associated with a smart contract (i.e., to "poke" such blockchain scripts) or to provide such blockchain scripts with access to external data (i.e., data which was previously not available on the blockchain). As will be described in greater detail below, a congress protocol may be used to provide pokers and data feeds for smart contracts on a blockchain network.

Figure 9:
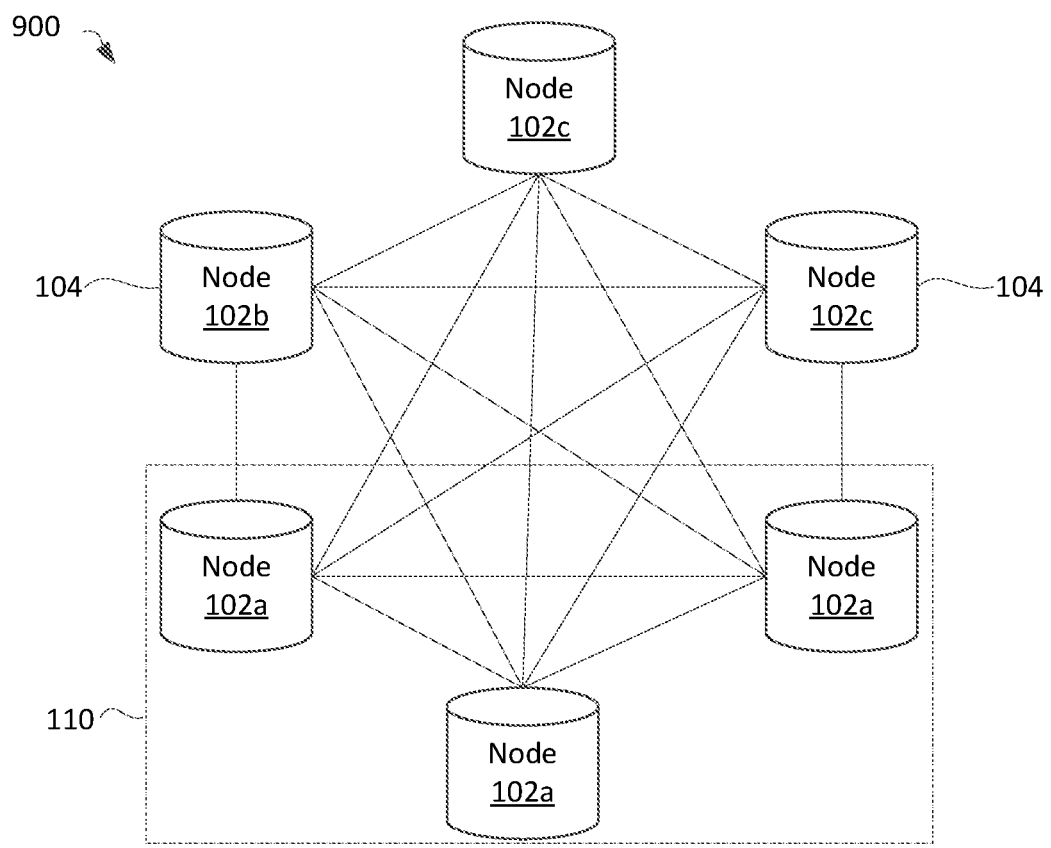
FIG. 9 is a block diagram of an example blockchain network.

Referring now to FIG. 9, a system for activating a script on a blockchain network 900 is illustrated in block diagram form. The system includes a plurality of nodes 102a, 102b, 102c which may be nodes of a blockchain network such as the blockchain network of FIG. 1. The nodes 102 include a plurality of congress nodes 102a. The congress nodes are nodes of the blockchain network 900 that have joined a group, referred to herein as a congress 110. The congress nodes may have joined the group in the manner described above with reference to FIG. 4.

At least one of the nodes in the system of FIG. 9 is a requester node 102b. The requester node 102b is a node which issues a request for activation of a script. Such a request may be accompanied by a deposit of digital assets which act as a bounty. More particularly, the digital assets may be held for distribution among nodes that facilitate fulfilment of the request. For example, the bounty may be distributed among information providing systems who aid in fulfilling the request, and among congress members whose participation provides security and reliability to the protocol.

The request may be a request to obtain external data (i.e., data not yet available on the blockchain network) and to provide such data to a script, such as a smart contract, or it may be a request to otherwise activate such a script. For example, the request may be a request to poke the smart contract when a specified condition is satisfied (e.g., to activate the smart contract at a particular time, or when external data satisfies specified conditions, etc.).

The nodes of the blockchain network 900 also include a plurality of information providing systems, which may also be referred to as information providing nodes 102c. These information providing nodes 102c are electronic devices that purport to fulfil or assist in fulfilling the request issued by the requester node 102b. For example, the information providing nodes 102c may operate to retrieve data from an external data source, such as from a web server.

As will be explained in greater detail below, while the information providing nodes generally function to fulfil the request issued by the requester node, the congress nodes cooperate to provide security and reliability. For example, the congress nodes may operate to improve the accuracy of information or actions performed or provided by the information providing nodes in purported fulfilment of the request.

Accordingly, nodes 102 (FIG. 1) in the blockchain network 100 (FIG. 1) may implement a trustless agent protocol to activate or facilitate activation of a script, such as a smart contract. Such nodes 102 may include computer-executable instructions stored in memory 220 (FIG. 2) which implement such a protocol. Such instructions, when executed by a processor 210 (FIG. 2), cause a node 102 (such as an electronic device 200 of the type described with reference to FIG. 2) to perform one or more methods of the protocols. Such methods may include any one or combination of the methods 300, 400, 500, 600, 700, 800, 1000 or 1100 of FIGS. 3-8, 10, and 11.

Figure 10:
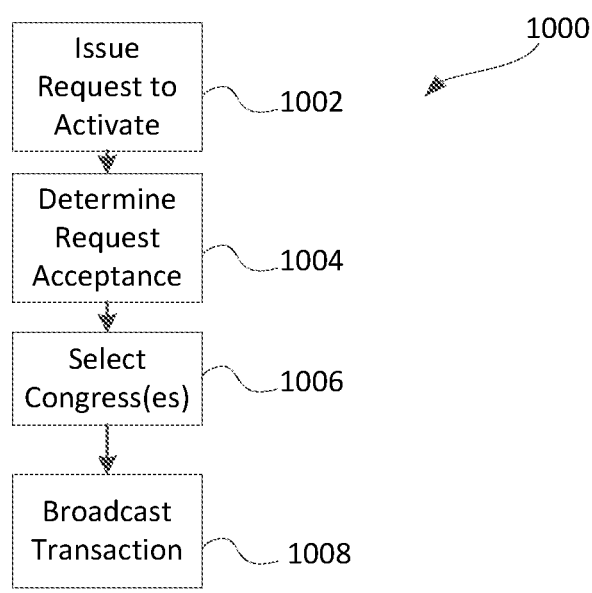
FIG. 10 is a flowchart of an example method for requesting activation of a script.

Reference will now be made to FIG. 10, which illustrates a method that may be performed by a requester node 102b (FIG. 9). The method of FIG. 10 may be referred to as a requester method 1000. The requester node 102b may be a node that is associated with a script, such as a party to a smart contract on the blockchain network.

At operation 1002 of the requester method 1000 (FIG. 10), the requester node 102b issues a request. The request is a request to activate a script, such as a smart contract. The request offers a bounty in the form of digital assets associated with the blockchain network 100 in exchange for securely and reliably activating the script. The request may include various information including one or more of: an identifier of a script associated with the request such as a public key associated with a script state; minimum participant information, which may specify a minimum number of information providing systems that are to be used to activate the script; fee information such as a mining fee that will be offered to a congress for facilitating the activation of the script; and/or a threshold indicator defining an acceptable amount of variation from consensus data and/or information about external data that is to be used in the activation of the script. Other data may be included in the request instead of or in addition to the data described above.

The request may be issued off of the blockchain (i.e., "off chain"). For example, the request may be issued on a web server accessible via the Internet. For example, the request may be issued on an exchange. The exchange may be a server on which a plurality of requests are from a plurality of requester nodes are published.

At operation 1004 of the requestor method 1000, the requestor node 102b determines that one or more congress has accepted the request. That is, the requestor node 102b determines that a congress (comprised of a plurality of congress nodes 102a) has offered to activate the script in accordance with the request.

The requester node 102b may, at operation 1006 select one or more congresses that accepted the request. The requester node 102b may, for example, evaluate reputational data for each congress against one or more thresholds. The reputational data may, for example, be based on a rating or other metric provided by other requestor nodes 102b that previously engaged the associated congress to facilitate completion of a request.

The requester node 102b may select a single one of the congresses that accepted the request or the requester node 102b may select a plurality of such congresses. The requestor node 102b may select all congresses that accepted the request or a subset of such congresses. By selecting a plurality of congresses, the selected congresses may be made to effectively compete against one another.

At operation 1008 of the requestor method, the requestor node broadcasts a transaction (which may be referred to as a blockchain transaction) payable to a congress pool(s) associated with the selected congress(es). The transaction includes a bounty, in the form of digital assets, which are payable to the public group address(es) associated with the congress(es) that accepted the request and that were selected at operation 1006. The transaction may include a link to data associated with the request. For example, the link may be a link to a server that stores information about the request. Such information may include, for example, an identifier of a script associated with the request such as a public key associated with a script state, minimum participant information, which may specify a minimum number of information providing systems that are to be used to activate the script, fee information such as a mining fee that will be offered to a congress for facilitating the activation of the script, a threshold indicator defining an acceptable amount of variation from consensus data and/or information about external data that is to be used in the activation of the script, or other information, conditions, or requirements.

The transaction that includes the bounty may be time locked so that the transaction only becomes valid at a specified time in the future. The time lock may prevent the transaction from being added to the blockchain until after the specified time.

In the case where multiple congresses are selected (at operation 1006) to facilitate completion of a request, the transaction may lock the bounty such that only the congress that completes the request the fastest may be permitted to claim the bounty.

Figure 11:
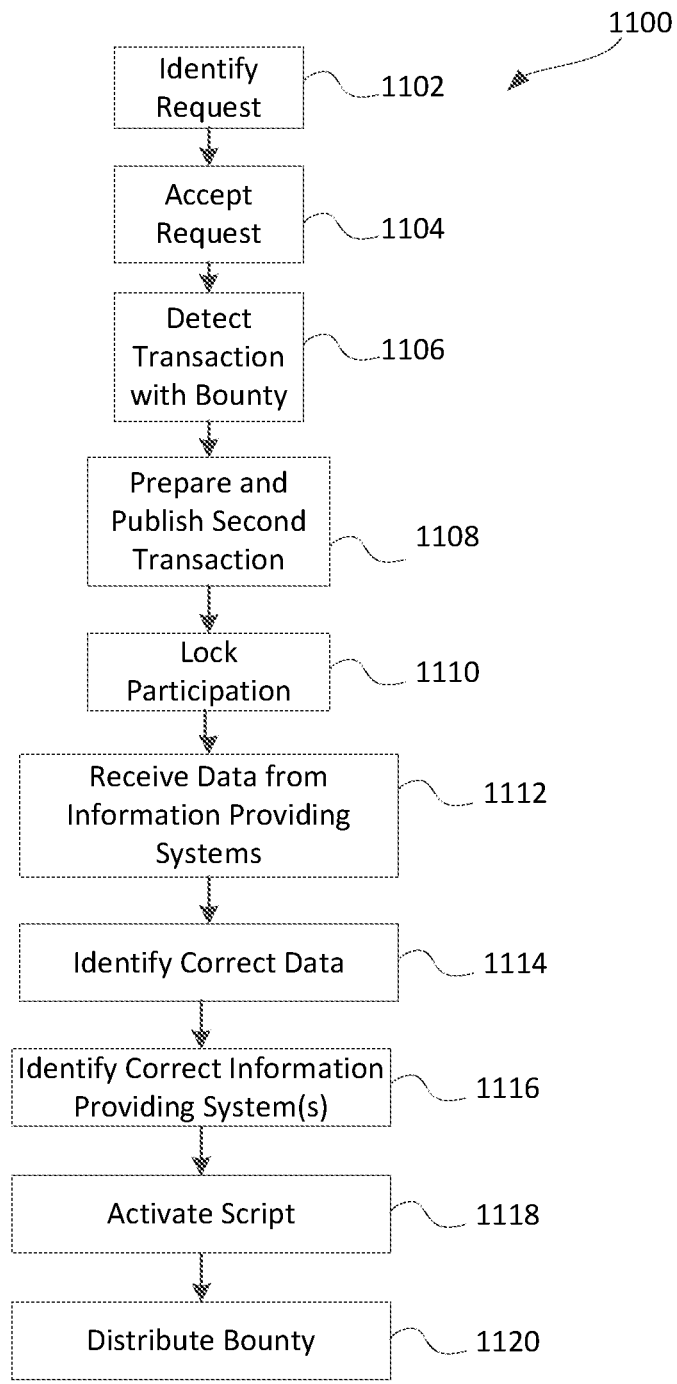
FIG. 11 is a flowchart of an example method for facilitating activation of a script.

Referring now to FIG. 11, a congress method 1100 is illustrated. The congress method 1100 may be performed by a node of the congress in cooperation with other nodes of the congress. That is, a node of the congress may be configured with computer-executable instructions for performing the method 1100 in cooperation with other nodes of the congress. That is, the congress method 1100 may be performed by one or more nodes that have joined a congress to become a congress node. More particularly, a node in a blockchain network may join a congress formed of a group of congress nodes by broadcasting a transaction to a congress pool. The transaction transfers control of one or more digital assets to the congress. Such digital assets act as a member deposit for the member making the deposit and are subject to confiscation as described above with reference to FIG. 5. Techniques for joining a congress are described in greater detail above, with particular reference to FIG. 4.

After a node has joined a congress to become a congress node, the method 1100 of FIG. 11 may be performed by that congress node in cooperation with other congress nodes for the same congress.

At operation 1102, the congress node identifies a request. The request may be the request issued at operation 1002 of the requestor method 1000 of FIG. 10.

At operation 1104, the congress node, in cooperation with other nodes of the congress, accepts the request. The acceptance of the request may be communicated to the requester node that issued the request. The congress nodes may be configured to cooperate with one another prior to accepting the request to determine whether the request will be accepted. For example, the congress nodes may reach a consensus on whether to accept the request. Consensus may be reached, for example, through use of private key shares. That is, the congress members may use their private key shares to effectively vote on whether to accept the request. If at least a threshold number of private key shares are used to effectively vote to accept the request, then the request will be accepted by the congress. This voting procedure may, for example, occur on a sidechain (i.e., on a blockchain that is not the main blockchain).

After the congress has accepted the request from the requester to activate the script, the congress node may, at operation 1106, detect a transaction from the requestor that includes a bounty associated with the request. That is, the congress node may determine that the transaction broadcast at operation 1008 of the requestor method 1000 has been added to the blockchain. As noted previously, the transaction broadcast at operation 1008 may be time locked so that it is not added to the blockchain until a specific time. In such cases, operation 1106 is performed after that time.

Once the transaction broadcast at operation 1008 (which may be referred to as a "first transaction") is determined by the congress node to have been confirmed (which may occur after at least a threshold number of blocks have been created on top of that first transaction), the node may prepare (at operation 1108) and publish a transaction (which may be referred to as a "second transaction") payable to the congress pool (i.e., to a public group address associated with the congress).

The second transaction may be configured to permit a plurality of information providing systems (e.g., the information providing nodes 102c of FIG. 9) to add inputs to the transaction. For example, the second transaction may be signed SIGHASH_ALL|SIGHASH_ANYONECANPAY. SIGHASH_ALL is a default signature hash type which signs the entire transaction except any signature scripts, preventing modification of the signed parts. SIGHASH_ANYONECANPAY is a signature hash type which signs only the current input.

An information providing system, such as an information providing node 102c may then commit to completing the request. To do so, the information providing system adds to the second transaction. For example, the information providing system adds digital assets held by the information providing system as an input to the second transaction. Such digital assets are provided by the information providing system as security (i.e., they are to be held as a security deposit) to ensure the information providing system operates in accordance with the request and in accordance with a protocol.

The information providing system also adds proof of solution data as metadata to the second transaction. For example, a hash that is based on a solution to the request may be added to the second transaction. The solution may be, for example, external data such as data available over the Internet or from another data source that is required for operation of a script. In such cases, the proof of solution data may be a hash that is based on the external data. The hash may also be based on a public key for the information providing system and/or some salt for security. The salt is random data that is used as an additional input to the hash function. By way of example, the second transaction may be updated by the information providing system to include metadata determined as HASH(q+PK+s), where q is the solution, PK is the public key for the information providing system, and s is the salt.

The congress may leave participation in the second transaction open until one or more predetermined conditions are satisfied. The predetermined condition(s) may, for example, be time-based conditions. For example, the predetermined condition(s) may close participation when at least a threshold amount of time has elapsed following publication of the second transaction. That is, information providing system may be provided with a certain amount of time during which they may participate. Following expiration of that period of time, they may no longer be permitted to participate.

The predetermined condition(s) may require participation of at least a threshold number of information providing systems. That is, participation in the second transaction may be left open until at least a threshold number of information providing systems have committed to completing the request by adding a respective deposit as an input to the second transaction.

The predetermined condition(s) for keeping participation open may be defined by the congress or may be defined by the requestor. For example, the requestor may include the predetermined conditions in the request.

At operation 1110, after determining that the predetermined condition(s) have been satisfied (e.g., after inputs have been added to the transaction by the information providing system(s)), the congress locks information providing system participation. That is, the congress node performing the method 1100 may cooperate with other congress nodes to prevent further commitments from being added to the second transaction. The congress node may do so by cooperating with other congress nodes to spend the second transaction (i.e., to unlock the second transaction). More particularly, the congress node may use a private key share held by that node, in cooperation with other such congress nodes, to cooperatively generate a valid cryptographic signature for the transaction to spend the transaction. Such congress nodes may cooperate by adding partial signatures generated based on respective private key shares until a valid signature is generated according to a threshold signature scheme. Once the second transaction has been mined and a sufficient number of blocks have been added on top of it so that it is confirmed, the transaction is considered to have been spent.

The second transaction serves as a register for the information providing systems that have committed to completing a request. That is, it acts as a register for information providing systems that have indicated that they have a solution to the request and have committed to providing the solution. The second transaction also serves to collect a deposit from each information providing system that is participating and to provide proof of the solution that the information providing system intends to submit so that the value cannot change at a later time and so that values cannot be copied from other participants.

After the second transaction has been spent, at operation 1112, data may be received, by the congress node, from the plurality of information providing systems that added an input to the second transaction. For example, the solution proposed by each information providing system is now provided by the information providing system to the congress nodes. The solution, q, may be sent together with the other information used in the hash that was added by the information providing system to the second transaction. For example, the solution, q, may be provided together with the public key, PK, for the information providing system and the salt, s.

After receiving the data at operation 1112, the congress node may confirm that the solution, q, corresponds to a committed solution (i.e. to the solution identified by the proof of solution data in the second transaction). For example, the congress node may perform a hash on the solution, q, the public key, PK and the salt, s (i.e. HASH (q+PK+s)). This hash may be compared with the hash in the second transaction to determine whether the solution corresponds to the committed to the committed solution. If the solution does not correspond to the committed solution (e.g., if the generated hash does not correspond to the hash in the second transaction), the solution (i.e., the data representing that solution) may be discarded so that it is not used in the following operations of the method 1000.

At operation 1114, the congress node, in cooperation with other congress nodes, identifies correct data (e.g., a correct solution) for the request. The congress nodes may, for example, determine a centre point for the data received from the plurality of information providing systems. For example, where the data represents numerical values, the centre point may be the average value of all values received at operation 1112 from information providing systems (i.e., the centre point may be determined as the mean of all values received). By way of further example, in some embodiments, the centre point may be the most common value or solution received from information providing systems (i.e., the centre point may be determined as the mode of all values received). By way of yet further example, in some embodiments, the centre point may be the middle value received from information providing systems (i.e., the centre point may be determined as the median of all values received). The centre point may be determined based on data received from the requestor. For example, the requester may specify the technique used to identify the centre point and, at operation 1114, the congress may use the specified technique.

The centre point may be selected by consensus of the congress nodes. By way of example, the determination of the centre point may be made on a sidechain and congress nodes may use respective private key shares to cooperatively generate a valid signature for a transaction that represents the centre point. When a valid signature is generated, this is an indication that the congress has reached consensus on the centre point.

At operation 1116, the congress node, in cooperation with other nodes of the congress, identifies the information providing systems that provided correct data. That is, the congress nodes may identify a subset of the information providing systems that provided data in purported fulfilment of the request. The subset consists of the information providing systems that provided data that is sufficiently similar to the correct data identified at operation 1114. For example, the nodes may identify, as the subset, the information providing systems that provided data proximate a centre point identified at operation 1114. It will be appreciated that, in some circumstances, all information providing systems that provided data may have provided correct data and in other circumstances, only a portion of such information providing systems may have provided correct data.

To identify the information providing systems that provided data that is sufficiently similar to the correct data, a threshold may be used. The threshold may be specified by the requestor. For example, the request issued by the requester may include a threshold indicator. The threshold indicator may be included in the request itself or it may be linked to in the request. That is, the request may link to data, such as data on a server, which defines the threshold indicator. The threshold indicator defines a requested precision and may be used to identify a subset of information providers that are considered to have submitted correct information. For example, the threshold indicator may specify a percentage or other metric used to determine whether given data is sufficiently similar to the correct data to be determined to be correct. The information providing systems that provided data within a threshold amount from the correct data are determined to be have offered sufficiently correct data at operation 1116 and are identified as having provided correct data.

In some instances, only data matching the correct data will be considered to be correct. That is, in some instances, the threshold indicator may be set to zero such that only data matching the correct data is considered sufficiently similar to the correct data to be determined to be correct. That is, if the threshold indicator is set to zero, the data must be the same as the correct data to be considered to be valid.

At operation 1118, the congress node, in cooperation with other congress nodes, activates the script associated with the request. The congress node may activate the script based on the correct data. For example, the congress node may activate the script based on the centre point of the data as determined at operation 1114. The congress nodes cooperate to send a transaction on the blockchain network that unlocks the script associated with the request. The transaction may include the correct data and may make use of this data according to the code in the script.

At operation 1120, the congress node cooperates with other nodes of the congress to distribute the bounty received in the transaction detected at operation 1106. More particularly, a transaction may be broadcast transferring a portion of the bounty to each information providing systems that is determined to have provided sufficiently correct data (which may be a subset of all information providing systems providing data in response to the request or may be all information providing systems when all such systems provide correct data in response to the request). For example, the congress node may, in cooperation with other congress nodes of the group of nodes forming the congress, authorize a transfer of digital assets to each information providing system in the subset. The transaction transfers digital assets encumbered by the congress public key to the public keys associated with the information providing systems that submitted sufficiently correct data. To sign the transaction, the congress node uses its private key share to generate a valid signature in cooperation with other congress nodes (who use respective private key shares sufficient to generate a valid signature according to the threshold signature scheme). The transaction may also distribute a portion of the bounty to one or more congress members.

The congress node, in cooperation with other nodes of the congress, may also return at least some of the deposits provided by the information providing systems. For example, a congress node may broadcast a transaction, which includes a valid signature generated in cooperation with other congress nodes according to the threshold signature scheme. The request may return the deposit to any information providing system that provided sufficiently correct data. The deposit for any information providing system that did not provide sufficiently correct data may be confiscated. That is, such a deposit may not be returned. For example, the deposit for the nodes that did not provide sufficiently correct data may be distributed among the nodes that did provide sufficiently correct values.

The methods described above have been generally described as being performed at a node, but features of the method rely on cooperation with other nodes and could be performed elsewhere.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
broadcasting a transaction, by a node in a blockchain network, to a congress pool
to join a congress formed of a group of nodes;
after the congress has accepted a request from a requester to activate a script, preparing, by the node, a blockchain transaction cryptographically locked with a public key associated with the congress pool, the blockchain transaction configured to permit a plurality of information providing systems to add inputs to the blockchain transaction, wherein the inputs include respective proof of solution data;
generating, after the inputs have been added to the blockchain transaction, by the node in cooperation with other nodes of the group, a valid-cryptographic signature for the blockchain transaction to unlock the blockchain transaction, the cryptographic signature generated by the node cooperating with the other nodes of the congress using a plurality of private key shares, wherein each private key share of the plurality of private key shares is generated within a Trusted Execution Environment (TEE) of an individual node of the congress;
after the transaction has been unlocked, receiving data from the plurality of information providing systems;
determining, by the node, whether the data received from at least one of the information providing systems corresponds with a committed solution based on the respective proof of solution data;
wherein in response to determining that the data received from the at least one of the information providing systems does correspond with a committed solution based on the respective proof of solution data, the method further comprises:
determining a centre point for the data received from the plurality of information providing systems; and
activating, by the node in cooperation with the other nodes of the congress, the script based on the centre point;
discarding, in response to determining that the data received from the at least one of the information providing systems does not correspond with a committed solution based on the respective proof of solution data, the data;
detecting a corrupted node within one of the plurality of nodes of the congress; and
setting a valid cryptographic signature to require greater than or equal to half of the plurality of private key shares when a corrupted node has been detected.

2. The computer-implemented method of claim 1, further comprising:
based on the centre point, identifying, by the node, a subset of the information providing systems that provided data proximate to the centre point; and
authorizing, by the node in cooperation with the other nodes of the group, a transfer of a token to each information providing system in the subset.

3. The computer-implemented method of claim 2, wherein the token included in the transfer includes one or more tokens received from the requester into the congress pool.

4. The computer-implemented method of claim 2, wherein the request includes a threshold indicator and wherein the subset is identified based on the threshold indicator.

5. The computer-implemented method of claim 4, wherein the threshold indicator is received from the requester.

6. The computer-implemented method of claim 1, wherein the inputs include tokens to be locked for security.

7. The computer-implemented method of claim 1, wherein the information providing systems include, in the blockchain transaction, a hash based on a public key, a solution to the request and salt.

8. The computer-implemented method of claim 7, wherein the data received from the plurality of information providing systems includes the public key, the solution to the request and the salt, the method further comprising:
generating the hash based on the public key, the solution to the request and the salt; and
comparing the generated hash with the hash included in the blockchain transaction.

9. The computer-implemented method of claim 1, further comprising:
   detecting malicious activity by a malicious party, wherein the malicious party is one of the nodes of the congress; and
   using a private key share to confiscate at least a portion of tokens previously transferred to the congress pool by the malicious party.

10. The computer-implemented method of claim 9, wherein confiscating comprises transferring to an unspendable account.

11. A non-transitory computer-readable storage medium comprising computer-executable instructions that, when executed, configure a processor to perform the method of claim 1.

12. An electronic device comprising:
   an interface device;
   a processor coupled to the interface device, the processor comprising a Trusted Execution Environment (TEE); and
   a memory coupled to the processor, the memory having stored thereon computer executable instructions that, when executed, configure the processor to perform the method of claim 1, wherein the step of generating the private key share associated with the electronic device is performed within the TEE.

13. The electronic device of claim 12, wherein the computer executable instructions are executed within the trusted execution environment.

* * * * *